(12) United States Patent
Miyashita et al.

(10) Patent No.: US 7,027,096 B2
(45) Date of Patent: Apr. 11, 2006

(54) IMAGE PICKUP CONTROL DEVICE FOR CONTROLLING AN EXPOSURE TIME AND A METHOD OF DRIVING AN IMAGE SENSOR DURING SUCH EXPOSURE TIME

(75) Inventors: Takeshi Miyashita, Asaka (JP); Kazuya Oda, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 864 days.

(21) Appl. No.: 09/826,002

(22) Filed: Apr. 5, 2001

(65) Prior Publication Data

US 2001/0028401 A1    Oct. 11, 2001

(30) Foreign Application Priority Data

Apr. 5, 2000   (JP) ............................. 2000-107995
Mar. 12, 2001  (JP) ............................. 2001-069051

(51) Int. Cl.
    H04N 5/222    (2006.01)
(52) U.S. Cl. .................................................. 348/372
(58) Field of Classification Search ................ 348/296, 348/297, 298, 311, 312, 320, 322
    See application file for complete search history.

(56) References Cited

U.S. PATENT DOCUMENTS

| 5,008,757 | A  | * | 4/1991  | Kimura et al. ............ 348/229.1 |
| 5,278,656 | A  | * | 1/1994  | Hynecek et al. ........ 348/207.99 |
| 5,452,048 | A  | * | 9/1995  | Edgar .......................... 396/180 |
| 6,151,073 | A  | * | 11/2000 | Steinberg et al. ........... 348/371 |
| 6,567,125 | B1 | * | 5/2003  | Shimizu ..................... 348/297 |

FOREIGN PATENT DOCUMENTS

| JP | 08-306908  | * | 11/1996 |
| JP | A8306908   |   | 11/1996 |
| JP | 09-168118  | * | 6/1997  |
| JP | A9168118   |   | 6/1997  |

* cited by examiner

Primary Examiner—David L. Ometz
Assistant Examiner—Hung Lam
(74) Attorney, Agent, or Firm—Birch, Stewart, Kolasch & Birch, LLP

(57) ABSTRACT

An image pickup control device of the present invention drives an image sensor including an output amplifier. A controller feeds a first control signal to a driver, which drives the image sensor, for controlling an exposure time. A switching circuit switches a power supply voltage for driving the output amplifier in accordance with a second control signal output from the controller and then feeds it to the output amplifier. The controller feeds the second control signal to the switching circuit for controlling it in accordance with the exposure time.

19 Claims, 7 Drawing Sheets

IMAGE PICKUP CONTROL DEVICE FOR CONTROLLING AN EXPOSURE TIME AND A METHOD OF DRIVING AN IMAGE SENSOR DURING SUCH EXPOSURE TIME

BACKGROUND OF THE INVENTION

1. Field of the Invention

The present invention relates to a device and a method for image pickup control for driving an image sensor to pick up a scene by, e.g., long exposure.

2. Description of the Background Art

It is a common practice with a camera of the type using a silver halide photosensitive type of film to shoot a night view, night sky or similar dark scene with low brightness by selecting a low shutter speed for long exposure or by using a high-speed film. This is also true with a digital still camera using a CCD (Charge Coupled Device) image sensor. Specifically, to shoot a dark scene, a digital still camera increases the amplification ratio and gain of image signals to thereby vary sensitivity.

A low shutter speed, however, increases the period of time over which photodiodes arranged in the CCD image sensor store signal charges, thereby causing dark current to excessively accumulate. Further, when the gain of an image signal is increased, a noise level rises together with the level of necessary pixel signals and therefore lowers the S/N (Signal-to-Noise) ratio of the image signal.

Japanese patent laid-open publication No. 9-168118, for example, discloses a solid-state image pickup device constructed to reduce dark current in a CCD chip. The image pickup device disclosed includes pulse generating means for generating charge reading pulses, horizontal drive pulses, vertical drive pulses and reset pulses, a plurality of drive means, and control means. The control means controls the feed of the each of the drive pulses and reset pulses to particular one of the drive means in correspondence to the feed of the charge reading pulses.

In the image pickup device taught in the above document, when photodiodes are caused to store charges over an exposure time of about 1/30 second, the feed of the vertical drive pulses, horizontal drive pules and reset pulses is interrupted in order to reduce heat to be generated and therefore dark current. When the exposure time is as short as about 1/60 second, the device is driven in a usual manner with the above pulses being continuously fed.

Japanese patent laid-open publication No. 8-306908 proposes a charge detecting element including a first source-follower circuit made up of transistors Tr1 and Tr2 and a second source-follower circuit made up of transistors Tr3 and Tr4 and following the first source-follower circuit. Different voltages V1 and V2 are respectively applied to the load transistors Tr2 and Tr4 in order to reduce the gate capacitance of the first source-follower circuit while improving the frequency characteristic of the second source-follower circuit.

As stated above, it has been customary to reduce noise to appear in charge transfer paths and a charge detecting element over a relatively short period of time by interrupting the feed of pulses to a drive system. However, a problem with the previously mentioned laid-open publication No. 9-168118 is that during exposure unnecessary charges cannot be discharged from the charge transfer paths because charge transfer is interrupted. Moreover, the amount of unnecessary charges increases with an increase in exposure time. The above document gives no consideration to the discharge of charges accumulating during long exposure.

Therefore, the charge transfer interruption scheme cannot simply be used to shoot a night view or a starry sky over an exposure time as long as several seconds to several ten seconds. Such a long exposure time gives an amount of exposure of 5 EV (Exposure Value) or above that is far greater than an amount assigned to a daytime shot.

Assume that exposure is effected over a long period of time without using the above-described conventional technology. Then, the charge detecting element built in an image sensor is driven over a long period of time and therefore generates more heat, heating elements around it. In this condition, photodiodes adjoining the charge detecting element generate unnecessary charges ascribable to heat more than the other photodiodes, resulting in an irregular distribution unnecessary charges. Presumably, the generation of unnecessary charges during long exposure is dependent on the geometrical distance between the individual photodiode and the charge detecting element in the photosensitive array and the structure of the image sensor. The temperature elevation of the photodiodes directly translates into an increase in dark current, generating charges having no relation to the amount of incident light.

For example, assume that a night view, a fine starry sky or similar scene whose major portion has a low brightness level is shot over an exposure time of more than 3 seconds. Then, fog appears noticeably in part of the resulting image around the charge detecting element. More specifically, the pixel level increases in accordance with the exposure time to such a degree that the above-mentioned part of the image appears somewhat white or appears in an unexpected color. The photographic fog is aggravated as the exposure time further increases. Such fog appears not only in an image shot at night, but also in an image shot by long exposure using a light attenuating filter or a small lens opening. An exclusive camera for shooting night scenes and starry skies usually includes a Peltier device that forcibly cools off an image sensor to thereby reduce the temperature elevation of the image sensor and therefore noise to appear in images. This kind of cooling device, however, is not practical when it comes to a digital camera that is handy, common equipment.

Local fog described above occurs without regard to an exposure mode, i.e., an automatic exposure mode or a manual exposure mode. To attain high image quality, it is a common practice to limit the exposure time during which charges are generated in an image sensor. This, however, makes it impossible to implement a camera suitable for nighttime shots as well as for daytime shots. Moreover, it is difficult to remove unnecessary charges ascribable to long exposure or to remove the influence of the unnecessary charges from pixel signals read out of an image sensor because the unnecessary charges are locally generated. In this manner, conventional technologies cannot easily cope with the local increase of dark current, i.e., an irregular dark current distribution ascribable to long exposure, i.e., heat generated by the charge detecting element.

SUMMARY OF THE INVENTION

It is an object of the present invention to provide an image pickup control device and an image pickup control method capable of reducing an irregular dark current distribution ascribable to long exposure.

In accordance with the present invention, an image pickup control device drives an image sensor including a photosensitive section in which a plurality of photosensitive devices are arranged for generating signal charges corresponding to incident light. A plurality of vertical transfer paths vertically transfer the signal charges. A horizontal transfer path horizontally transfers the signal charges transferred from the vertical transfer paths. An outputting circuit detects the signal charges transferred from the horizontal transfer path and outputs electric signals corresponding thereto. The image pickup control device includes a driver for driving the image sensor. A controller feeds a first control signal to the driver in order to control an exposure time over which the image sensor generates the signal charges. A switching circuit switches a power supply voltage for driving the outputting circuit in accordance with a second control signal and then feeds the power supply voltage to the outputting circuit. The driver includes a signal generating circuit for generating timing signals for causing the image sensor to transfer the signal charges, which are generated over the exposure time, to the outputting circuit via the vertical transfer paths and horizontal transfer path. The controller feeds the second control signal to the switching circuit for controlling it in accordance with the exposure time.

Also, in accordance with the present invention, a method of controlling an image sensor of the type described begins with a step of determining whether or not the exposure time of the photosensitive section is a preselected long exposure time. If the exposure time is the preselected long exposure time, the image sensor is driven by a low voltage lower than a usual drive voltage. When the signal charges generated in the photosensitive section are to be read out, the image sensor is driven by the usual voltage instead of the lower voltage.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
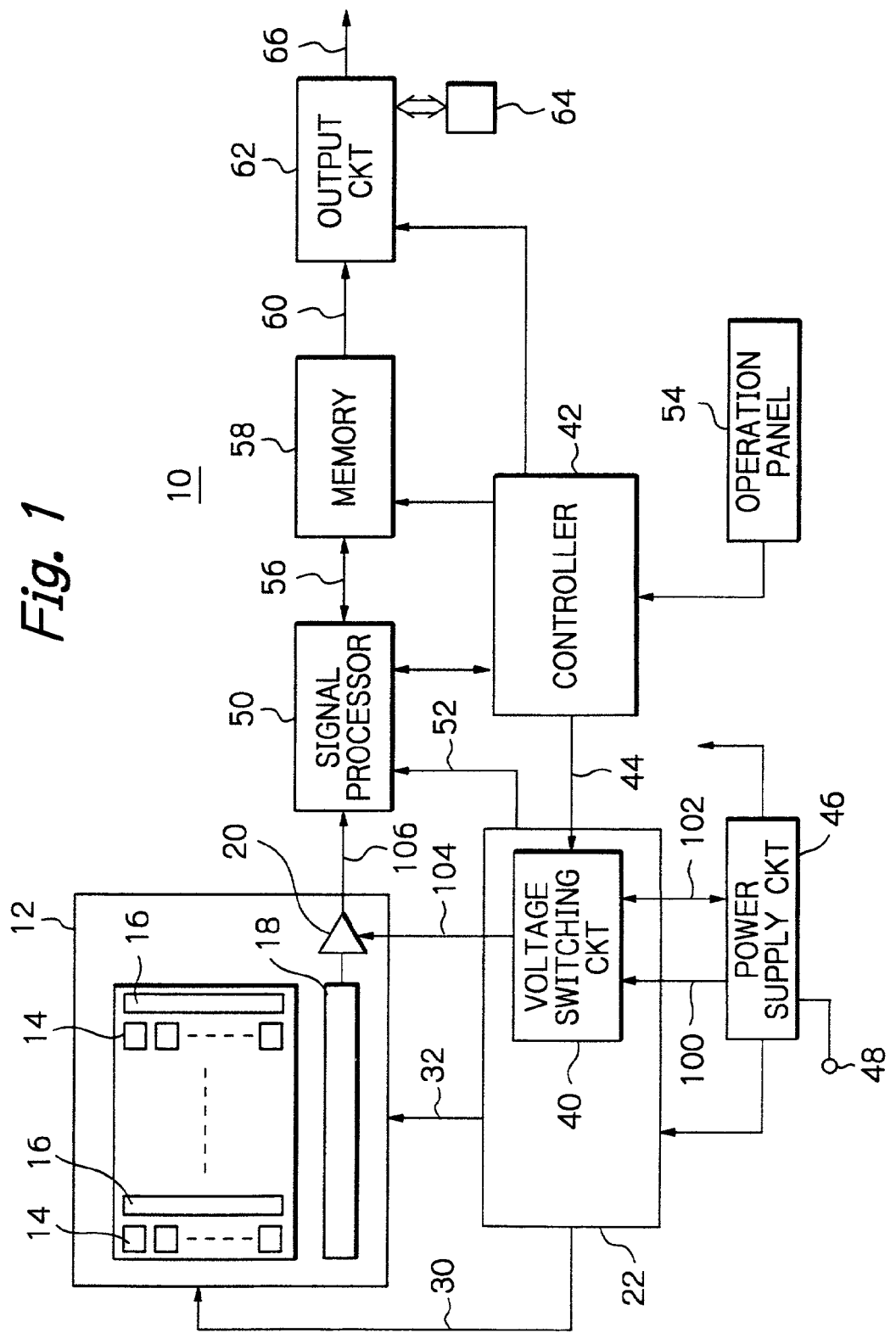
FIG. 1 is a schematic block diagram showing a digital camera to which a preferred embodiment of the image pickup control device in accordance with the present invention is applied.

Referring to FIG. 1 of the drawings, a digital camera to which an image pickup control device embodying the present invention is applied is shown and generally designated by the reference numeral 10. As shown, the digital camera 10 includes an image sensor 12 to which an optical image representative of a scene is incident via a lens not shown. The image sensor 10 outputs an image signal representative of the optical image. The camera 10 is capable of producing an attractive still picture with a broad range of exposure time, i.e., from $\frac{1}{1000}$ second to several ten seconds.

When the exposure time exceeds 1 second, the camera 10 lowers a drive voltage to be applied to the image sensor 12 so as to produce a uniform, attractive image despite such a long exposure time. It is to be noted that part of the camera 10 not relevant to the understanding of the present invention is not shown nor will be described. Signals are designated by reference numerals attached to connection lines on which they appear.

As shown in FIG. 1, the image sensor 12 is implemented by a solid-state image sensor including a plurality of photodiodes or photosensitive devices 14, which are arranged in horizontal lines and vertical columns. The photodiodes 14 each generate a signal charge corresponding to a quantity of light incident thereto. Signal charges generated by the photodiodes 14 are vertically transferred along a plurality of vertical registers or vertical transfer paths 16 and then horizontally transferred along a horizontal register or horizontal transfer path 18. An output amplifier or outputting portion 20 is connected to one end of the horizontal register 18 in order to detect the signal charges sequentially output from the horizontal register 18 while outputting electric signals corresponding to the signal charges.

In the illustrative embodiment, for the image sensor 12, use is made of a CCD image sensor. R, G and B color filter segments, not shown, are arranged in a preselected pattern in front of the photodiodes 14 in the direction of light incidence. The image sensor 12 therefore outputs RGB dot-sequential pixel signals. In FIG. 1, the photodiodes 14 are shown as having a square shape each, as seen in a plan view, and horizontally arranged. Alternatively, the photodiodes 14 having a polygonal shape each may be arranged in a honeycomb pattern. The image sensor 12 performs photoelectric conversion, charge transfer and charge detection in accordance with vertical drive pulses 30 and horizontal drive pulses 32, which are fed from a driver 22. The output amplifier 20 detects charges in accordance with a drive voltage fed from the driver 22.

A reference oscillator, not shown, generates a reference clock. The driver 22 outputs various drive pulses in timed with the reference clock. The drive pulse include shift pulses for shifting the signal charges from the photodiodes 14 to the corresponding vertical registers 16, and charge transfer pulses for driving the vertical registers 16 and horizontal register 18. Further, the drive pulses include a sweep signal for sweeping charges existing on the registers or transfer paths 16 and 18, and a read-out signal for reading out the transferred signal charges as electric signals. The driver 22 feeds such drive signals to the image sensor 12. In addition, the driver 22 generates field-through clamp pulses for effecting correlated double sampling, a pixel clock for processing the pixels of the image signal, and other various timing signals. The timing signals appear on the output 52 of the driver 22 to which a signal processor 50 is connected.

The driver 22 causes a mechanical shutter, not shown, adjoining the image sensor 12 at the scene side to selectively open or close under the control of a controller 42. The mechanical shutter allows light from a scene to be incident to the image sensor 12 when opened. In addition, by outputting the shift pulses, the driver 22 causes the image sensor 12 to generate signal charges over a controlled exposure time.

The driver 22 includes a voltage switching circuit 40 for variably controlling the drive voltage that drives the image sensor 12. Specifically, the voltage switching circuit 40 switches a power supply voltage for driving the output amplifier 20 in accordance with a control signal 44, which is fed from the controller 42. A power source circuit 46 has a first output 100 and a second output 102 connected to the voltage switching circuit 40. Usually, the voltage switching circuit 40 connects the first power supply output 100 to its output 104. In response to the control signal 44, the circuit 40 connects the second power supply output 102 to its output 104. The output 104 is connected to the output amplifier 20 of the image sensor 12.

The output amplifier 20 is driven by the drive voltage applied to its input 104 and detects signal charges sequentially transferred via the horizontal register 18. At the same time, the output amplifier 20 produces electric signals corresponding to the detected signal charges on its output 106.

Figure 2:
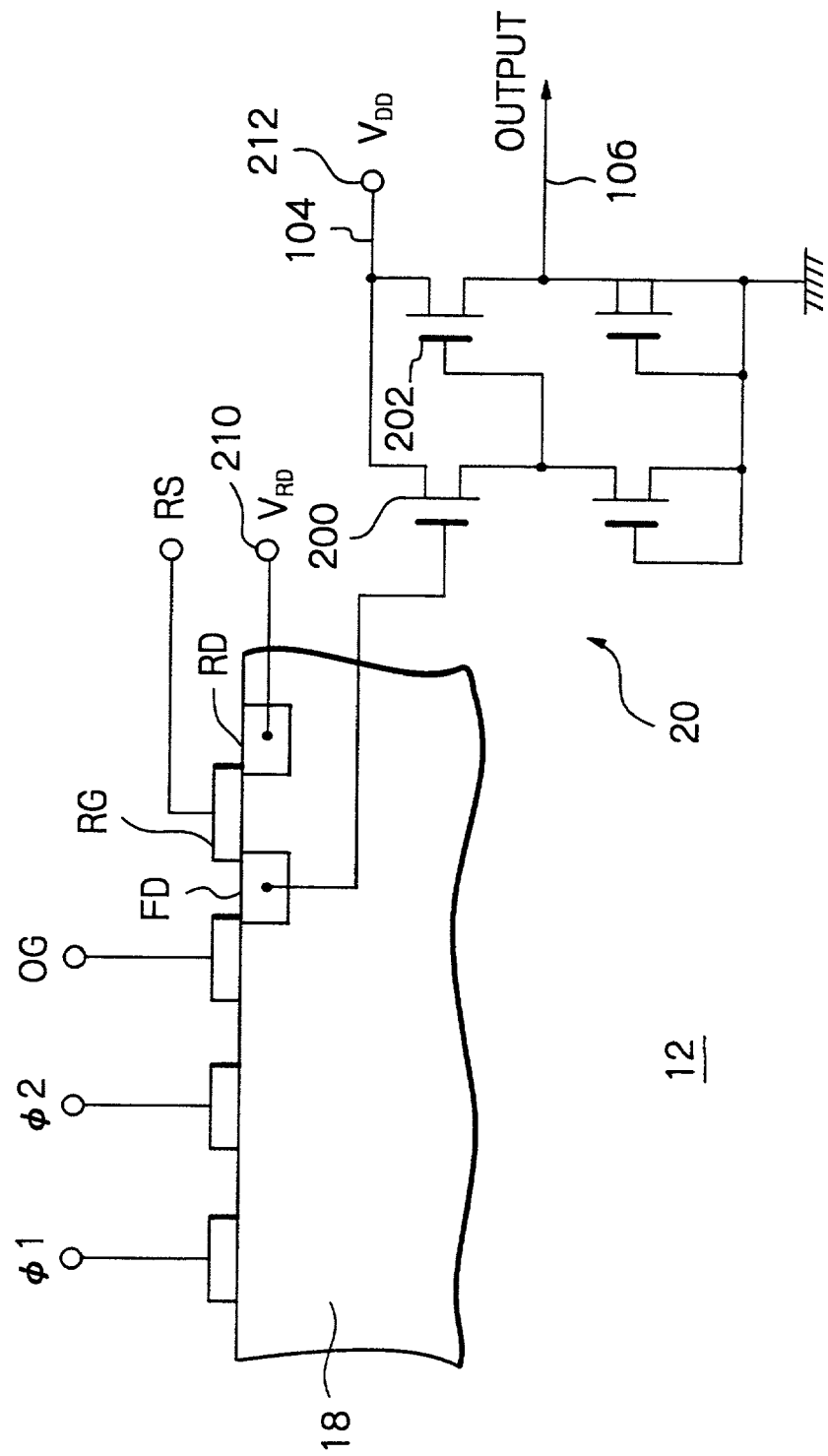
FIG. 2 shows a specific configuration of an output section included in an image sensor that is included in the digital camera.

FIG. 2 shows a specific configuration of output portion of the image sensor 12 in a sectional view. As shown, the image sensor 12 includes a floating diffusion (FD) layer adjoining on end of the horizontal register 18, which is formed on a silicon substrate. When a reset pulse RS turns on a reset gate RG, a reset voltage is applied to the FD layer and deposits a preselected potential on the FD layer. When an output pulse OG turns on an output gate, the pixel-by-pixel signal charges transferred along the horizontal register 18 are injected into the FD layer.

A source-follower circuit is formed on the same substrate as the horizontal register 18 for effecting impedance conversion. The source-follower circuit includes a first transistor 200 and a second transistor 202. The first transistor 200 is connected to the FD layer and feeds its output to the gate of the second transistor 202 in accordance with the signal charge input to its gate. The driver 22 applies a voltage VDD to the source of each of the two transistors 200 and 202. The source-follower circuit produces a pixel signal whose voltage corresponds to the potential of the FD layer on its output OUTPUT.

As stated above, in the illustrative embodiment, the driver 22 applies the drive voltage VDD to the sources of the two transistors 200 and 202, which constitute the source-follower circuit. When the actual exposure time is longer than a preselected period of time, the voltage switching circuit 40 switches the drive voltage VDD to lower one under the control of the controller 42. As a result, the source-follower circuit is driven by a low voltage and reduces heat that the transistors 200 and 202 generate during long exposure. The output OUTPUT of the source-follower circuit is the output 106 of the image sensor 12 and connected to the signal processor 50.

More specifically, the driver 22 selectively generates a first voltage VDD of about 16 V or a second voltage VDD of around 3 V, e.g., 3.3 V. The first voltage VDD causes the source-follower circuit to deliver to the signal processor 50 electric signals whose pixel levels correspond to the signal charges generated over a desired exposure time. The second voltage VDD sweeps needless charges sequentially transferred along the horizontal register 18, while maintaining the output amplifier 20 operative.

As stated above, the voltage switching circuit 40 applies the voltage VDD of about 16 V to the output amplifier 20 so long as the desired exposure time lies in an ordinary range. However, when the controller 42 feeds the control signal 44 representative of an exposure time exceeding the above range, the circuit 40 applies the voltage of about 3 V to the output amplifier 20.

If desired, the voltage switching circuit 40 may be included in the power supply circuit 46 and apply either one of the first and second voltages VDD to the output amplifier 20 under the control of the controller 42. Also, the circuit 40 may selectively output three or more drive voltages that are either stepwise or stepless. Such drive voltages should preferably be sequentially lowered with an increase in exposure time.

The power supply circuit 46 has a terminal 48 to which a battery or a DC adapter may be connected, as desired. The circuit 46 produces the first and second voltages VDD from a DC voltage input via the terminal 48. In addition, the circuit 46 generates DC voltages for driving the various sections of the camera 10.

The controller 42 controls the operation of the entire camera 10 in accordance with the manipulation of an operation panel 54, while controlling the driver 22 with the control signal 44. The controller 42 will be described more specifically later.

The signal processor 50, connected to the output 106 of the image sensor 12, executes various kinds of analog and digital signal processing with the pixel signals 106, which are input point-sequentially. The signal processor 50 includes a correlated double sampling (CDS) circuit, a clamping circuit, an analog-to-digital converter (ADC), a color separating circuit, a correcting circuit, and YC (luminance and chrominance) converting circuit, although not shown specifically.

The CDS circuit executes correlated double sampling with the input pixel signals 106 in accordance with the timing signal fed from the driver 22. The clamping circuit clamps the preselected level of the pixel signals output from the CDS circuit. The ADC converts the analog pixel signals to digital image data at the consecutive pixel timing. The color separating circuit separates the color components of the image data on the basis of the pattern of the color filter segments arranged in the image sensor 12. The correcting circuit corrects the color balance, tonality and so forth of the individual color component. The YC converting circuit converts the pixel values of the color components to YC data represented by luminance and chrominance.

The signal processor 50 writes the image data being processed and processed in a memory 58 connected to the circuit 50 by a connection line 56. The memory 58 has a capacity great enough to store at least one frame of image data. Also, the signal processor 50 selectively uses the memory 58 as a work area in the event of signal processing. For example, by using the memory 58, the signal processor 50 may change the image size of the image data or correct the image data. The image data stored in the memory 58 are read out under the control of the controller 42 and input to an output circuit 62.

The output circuit 62 includes a compressing circuit and a record/reproduction control circuit although not shown specifically. The compressing circuit compresses, or codes, the YC data read out of the memory 58. The recording/reproduction control circuit writes the coded data in a memory card or similar data recording medium 64 removably mounted to the camera 10. Further, the output circuit 62 generates image data matching with a monitor, printer or similar image output terminal or a communication control unit, which may be connected to an output 66.

The controller 42 is implemented as a microcomputer system responsive to the manipulation of the operation panel 54. Specifically, the controller 42 sets up, e.g., a camera mode for shooting a desired scene or a reproduction mode for reproducing stored image data. The controller 42 then controls the various circuits in accordance with a program assigned to the mode set up.

A shutter release button, not shown, has a first stroke or half-stroke position and a second stroke or full-stroke position. The operation panel 54 includes a shutter switch, not shown, for selecting either one of two different connection states each corresponding to one of the first and second strokes of the shutter release button. The shutter switch feeds a release signal representative of the first stroke or the second stroke to the controller 42. The operation panel 42 additionally includes a mode dial on which the camera mode or the reproduction mode may be input. The operation panel 42 feeds information representative of the position of the mode dial to the controller 42.

When the shutter release is pressed by the first stroke, the controller 42 executes photometry and range finding on the basis of image data being output. The controller 42 then controls the exposure value and the focus of the lens in accordance with the results of photometry and range finding. More specifically, the camera 10 is operated in a movie mode, as distinguished from the camera mode, for continuously shooting a desired scene to thereby generate a plurality of consecutive frames of image data. The controller 42 calculates, based on the luminance level of the above image data, an exposure value to be used in the camera mode to follow. In the illustrative embodiment, the controller 42 sets up the movie mode when the shutter release is pressed by the first stroke, and then sets up the camera mode when it is pressed by the second stroke.

By referencing a table listing lens openings and shutter speeds in one-to-one correspondence, the controller 42 determines an exposure time, or shutter opening time, matching with the calculated exposure value. When the operator of the camera 10 selects a manual exposure mode on the operation panel 54, the controller 42 identifies a shutter speed, or exposure time, selected on the operation panel 54 by hand.

On detecting the second stroke of the shutter release, the controller 42 generates a pickup control signal that causes the mechanical shutter to open over the determined exposure time and then close. The pickup control signal is input to the driver 22. The illustrative embodiment uses the mechanical shutter for controlling the exposure time, as stated above. Alternatively, the controller 42 and driver 22 may have an electronic shutter function for controlling the generation of signal charges by the image sensor 12 and reading out the signal charges at a timing that corresponds to the exposure time.

In the illustrative embodiment, when the exposure time or shutter speed exceeds a reference period of time, e.g., 1 second, the controller 42 feeds the control signal 44 to the driver 22. The control signal 44 causes the driver 22 to drive the output amplifier 20 with the low voltage. So long as the shutter speed is 1 second or less, the controller 42 does not output the control signal 44, so that the driver 22 drives the output amplifier 20 with the usual or high voltage. The reference period of time is a threshold up to which the adverse influence of long exposure as to image quality is negligible. In the illustrative embodiment, up to the threshold, thermal noise ascribable to those photodiodes 14 subjected to heat, which is generated by the output amplifier 20, more than the others remains below a preselected level.

If an exposure time is known before the pickup of a still picture, then the controller 42 determines whether or not the exposure time exceeds 1 second, and then executes exposure control. In the event of long exposure, the controller 42 feeds the control signal 44 to the driver 22, as stated above. If an exposure time is not known before a shot, then the controller 42 feeds the control signal 44 to the driver 22 on the elapse of 1 second. In response, the driver 22 automatically drives the output amplifier 20 with the low voltage. This is effective when the driver 22 automatically controls the exposure time independently of the control of the controller 42. For example, such control should preferably be executed when the brightness of the scene varies during long exposure and requires the exposure value to be corrected accordingly. This is also true with a bulb shot.

Figure 3:
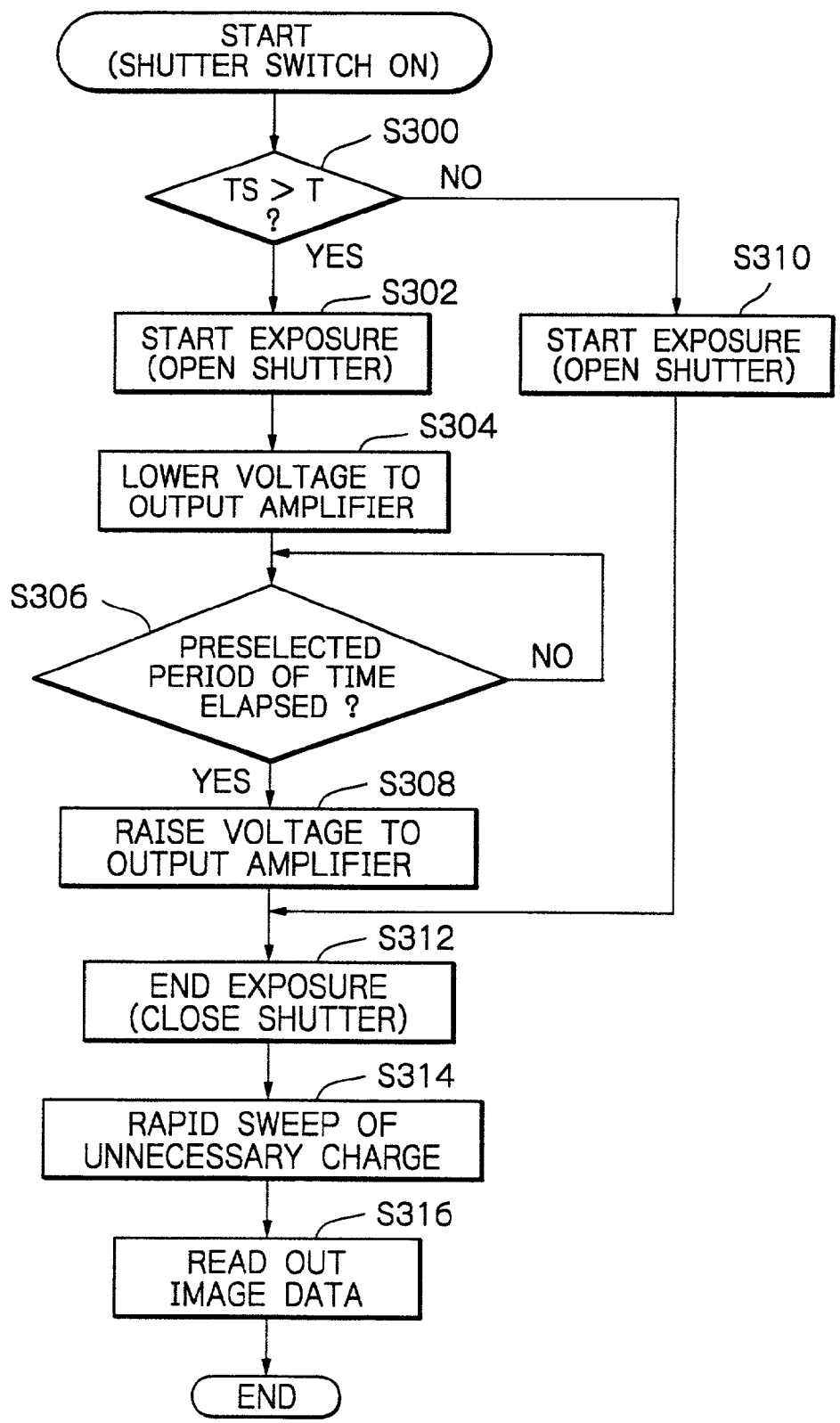
FIG. 3 is a flowchart demonstrating a specific operation of the illustrative embodiment.

A specific operation of the illustrative embodiment will be described with reference to FIGS. 3 and 4. Assume that the operator of the camera 10 selects the camera mode on the mode dial and then presses the shutter release by the first stroke, i.e., to the half-stroke position. Then, a release signal representative of the first connection state of the shutter switch is input to the controller 42. In response, the controller 42 measures the brightness level of the scene on the basis of image data output from the image sensor 12 and then processed by the signal processor 50. The controller 42 determines an exposure value for an actual shot in accordance with the measure luminance level. The controller 42 then determines, based on the exposure value, a set exposure time TS and an exposure value with which the image sensor 12 is expected to shoot the scene in response to the second stroke of the shutter release. In addition, when the operator selects a manual exposure mode, the controller 42 determines the set exposure time TS matching with an exposure time selected by hand.

Figure 4:
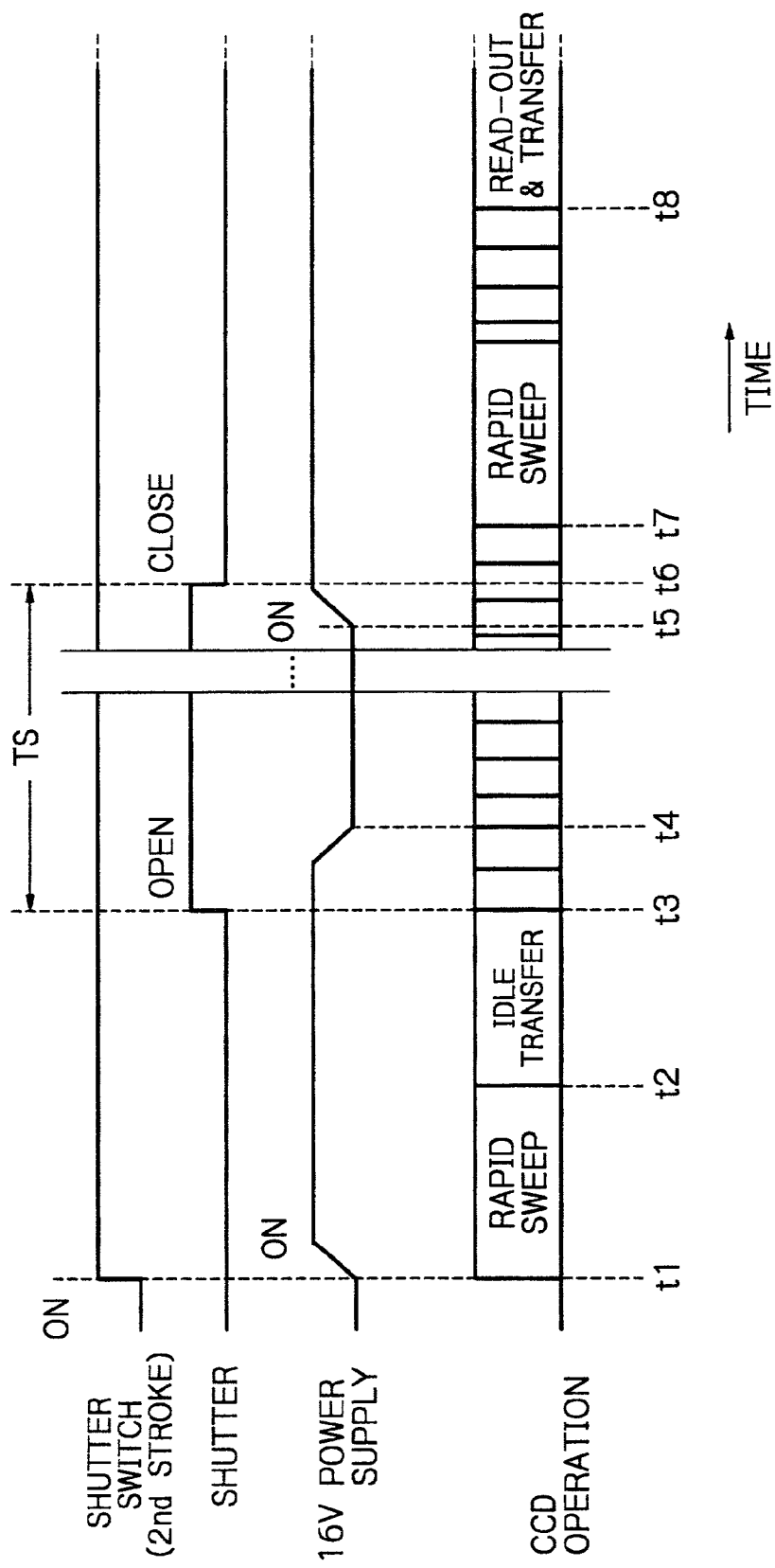
FIG. 4 is a timing chart associated with FIG. 3.

Assume that the operator presses the shutter release by the second stroke, i.e., to the full-deep position at a time t1 shown in FIG. 4. Then, the shutter switch delivers a release signal representative of the second stroke to the controller 42. In response, the controller 42 determines whether or not a set exposure time TS determined is longer than the reference period of time T (step S300). In the illustrative embodiment, the reference period of time T is selected to be 1 second, as stated previously. If the answer of the step S300 is positive (Yes), then the controller 42 feeds a shoot signal to the driver 22 for causing it to open the shutter.

In response to the shoot signal, the driver 22 drives the image sensor 12. At the same time, the driver 22 applies the first drive voltage of 16 V to the output amplifier 20 via its output 104. The image sensor 12 starts rapidly sweeping unnecessary charges remaining in the photodiodes 14. Subsequently, at a time t2, the image sensor 12 starts idle transfer for transferring the unnecessary charges existing on the vertical resistors 18 and horizontal register 18. At a time t3, at which the idle transfer ends, the driver 22 opens the shutter to thereby start exposure (step S302).

On the elapse of 1 second, the controller 42 feeds the control signal 44 to the driver 22, i.e., the voltage switching circuit 40. In response, at a time t4, the voltage switching circuit 40 selects the second voltage of 3 V in place of the first voltage of 16 V and drives the output amplifier 20 with 3 V (step S304). The first voltage is applied to the sources of the source-follower circuit stated earlier.

Subsequently, the controller 42 determines whether or not a preselected period of time has elapsed since the opening of the shutter (step S306). In the illustrative embodiment, the preselected period of time is selected to be slightly shorter than the set exposure time TS. Therefore, if the answer of the step S306 is Yes, the controller 42 causes the driver 22 to again drive the output amplifier 20 with the first voltage of 16 V immediately before the shutter closes, i.e., at a time t5 immediately before the end of exposure (step S308). The controller 42 then causes the driver 22 to close the shutter at a time t6 (step S312).

On the other hand, if the answer of the step S300 is negative (No), the controller 42 immediately causes the driver 22 to open the shutter for starting exposure (step S310). In this case, the controller 42 does not output the control signal 44, so that the driver 22 drives the output amplifier 20 with the first voltage of 16 V. On the elapse of the set exposure time TS, the controller 42 executes the step S312.

At a time t7, the image sensor 12 starts rapidly sweeping unnecessary charges remaining on the vertical registers 16 and horizontal register 18 (step S314). Subsequently, at a time t8, signal charges generated in the photodiodes 14 start being shifted to the associated vertical registers 16 by field shift and then read out (step S316).

Specifically, in the step S316, the vertical registers 16 sequentially transfer the signal charges toward the horizontal register 18 in accordance with the horizontal drive pulses 30. The horizontal register 18 sequentially transfers the signal charges delivered from the vertical registers 16 toward the output amplifier 20 in accordance with the horizontal drive pulses 32. The output amplifier 20 detects the consecutive signal charges representative of pixels. The signal charges sequentially detected by the output amplifier 20 are read out via the output 106 as electric signals and input to the signal processor 50, as stated earlier.

The signal processor 50 executes correlated double sampling with the electric signals or pixel signals, clamps a preselected level of the pixel signals, and then converts the pixel signals to digital data. Further, the signal processor 50 separates the color components R, G and B, corrects the color balance and tonality color by color, and then converts the corrected color components R, G and B to YC data. The YC data are written to the memory 58.

The output circuit 62 compresses the YC data read out of the memory 58. The compressed or coded image data are written to the data recording medium 64 together with data representative of the exposure value, i.e., lens opening and shutter speed and other information. At this instant, the controller 42 may add information, which shows that the drive voltage was switched due to a long exposure time, to the image data to be stored in the data recording medium 64. Such additional information successfully distinguishes the above image data from image data resulting from an ordinary shot.

Figure 5:
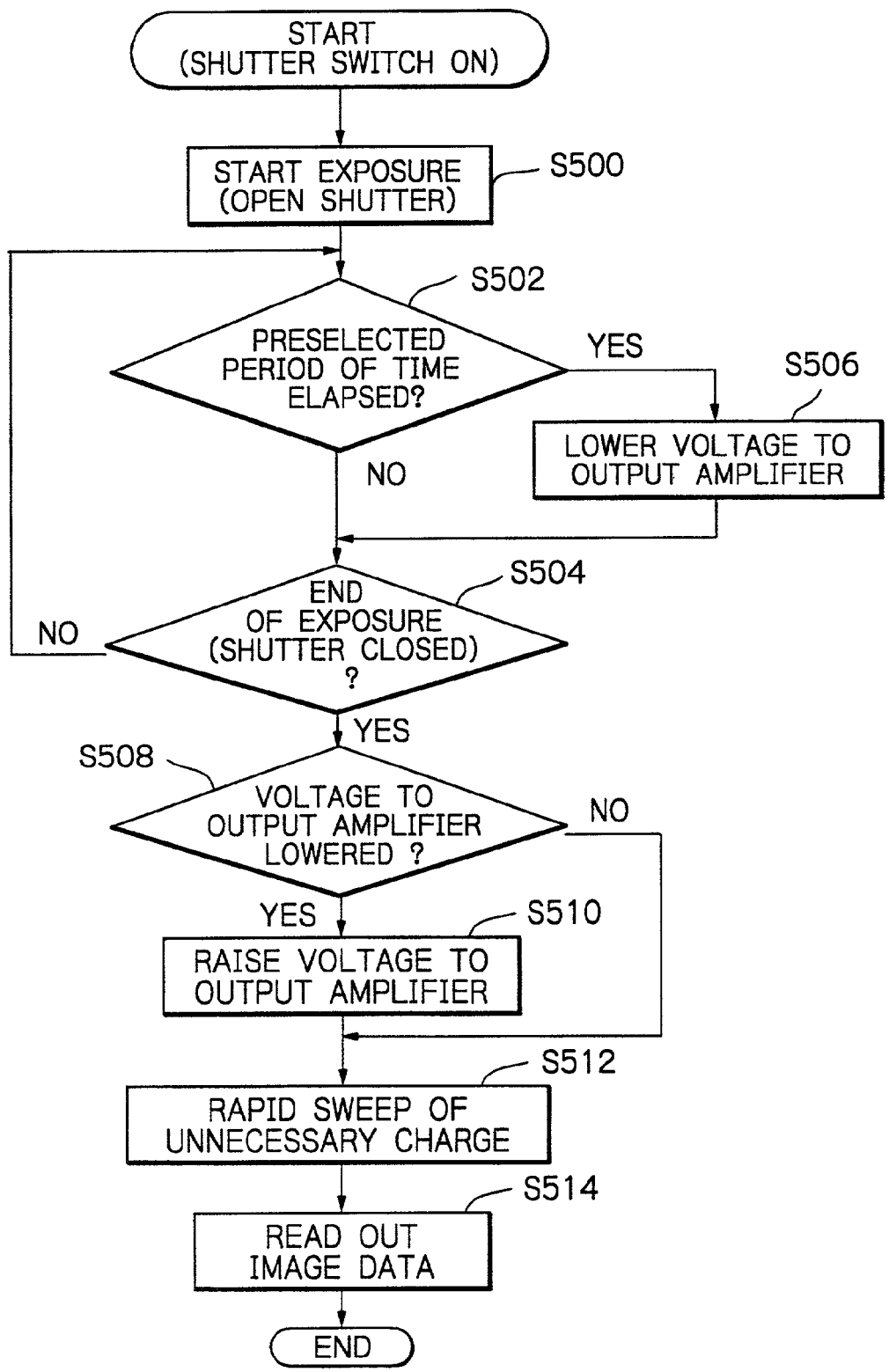
FIG. 5 is a flowchart showing a specific operation of an alternative embodiment of the present invention.
Figure 6:
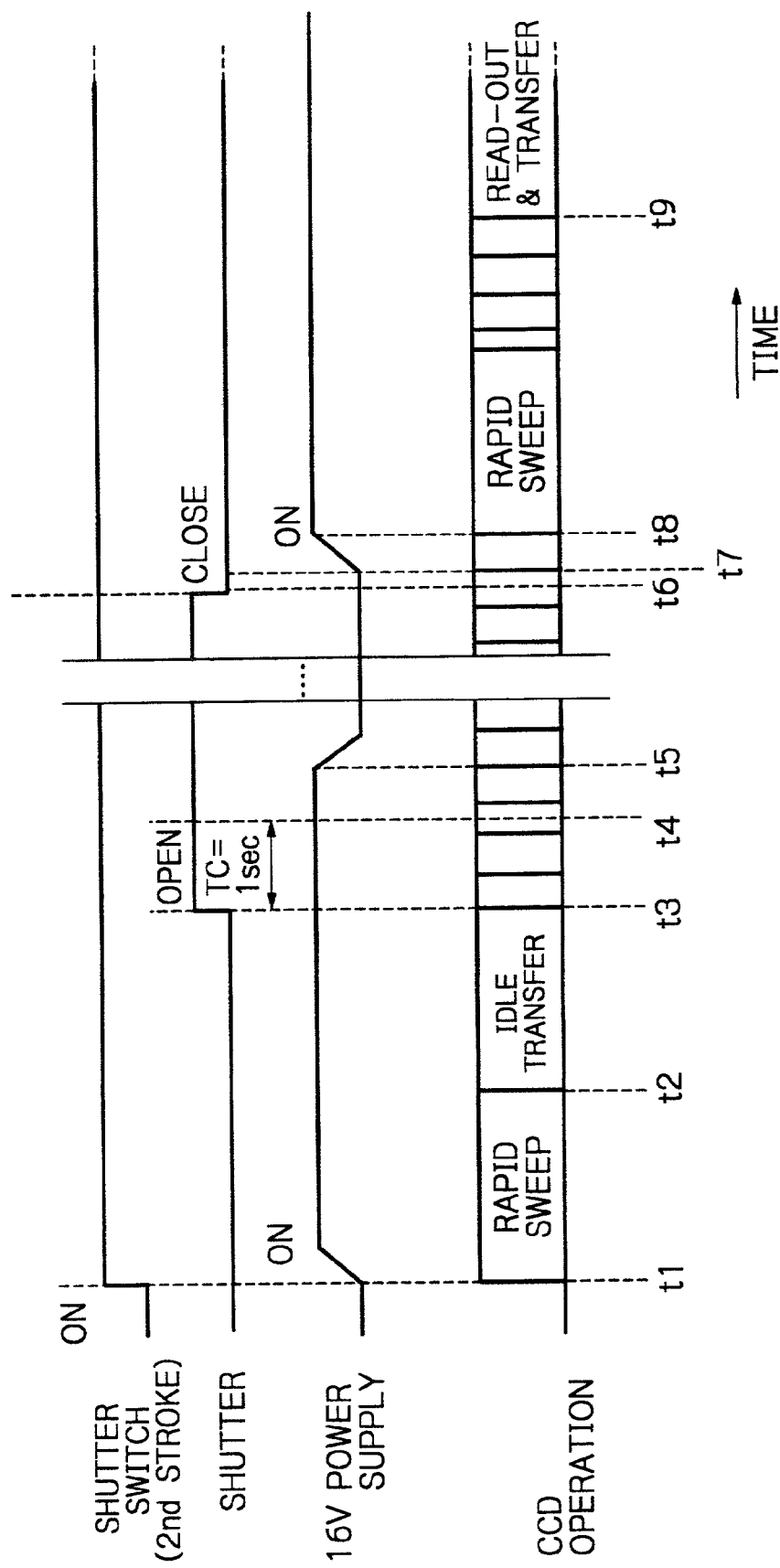
FIG. 6 is a timing chart associated with FIG. 5.

The embodiment described above has assumed that the set exposure time TS is known beforehand. It sometimes occurs that the controller 42 cannot determine an exposure time immediately before a shot or during shot, i.e., the time when exposure will end. For example, the controller 42 cannot determine an exposure time when the operator commands the end of exposure on the operation panel 54 in the event of, e.g., bulb exposure. This is also true when the image pickup block including the image sensor 12 and drive circuitry executes image pickup processing alone. An alternative embodiment to be described hereinafter with reference to FIGS. 5 and 6 is desirable to cope with the above occurrence. The alternative embodiment is also practicable with the circuitry shown in FIG. 1.

Briefly, the alternative embodiment differs from the previous embodiment in that the controller 42 determines whether or not an exposure time elapsing is a long exposure time and controls the driver 22 in accordance with the result of decision. Also, the controller 42 lowers the drive voltage after the start of exposure and again raises the drive voltage on detecting the closing of the shutter, i.e., the end of exposure.

Specifically, assume that the operator selects the camera mode on the mode dial, presses the shutter release by the first stroke, and then presses it by the second stroke. Then, the shutter switch delivers a release signal representative of the second stroke to the controller 42. In response, the controller 42 causes the image sensor 12 to perform rapid sweeping (time t1, FIG. 6) and then perform idle transfer (time t2) via the driver 22. The driver 22 opens the shutter at a time t3 to thereby start exposure (step S500). At this instant, the driver 22 is applying the first voltage of 16 V to the output amplifier 20.

A timer, not shown, included in the controller 42 starts counting time after the start of exposure. The controller 42 determines whether or not the timer has reached a preselected period of time TC (step S502). In the illustrative embodiment, the preselected period of time TC is selected to be about 1 second that distinguishes ordinary exposure and long exposure.

If the answer of the step S502 is No, the controller 42 determines whether or not the exposure has ended, i.e., whether or not the shutter has closed (step S504). If the answer of the step S504 is No, meaning that the exposure is still under way, then the controller 42 repeats the step S502. If the answer of the step S502 is Yes (time t4), the controller 42 feeds the control signal 44 to the driver 22. In response, the driver 22 switches the drive voltage from the first voltage of 16 V to the second voltage of 3 V (step S506). As a result, the driver 22 drives the output amplifier 20 with 3 V.

If the answer of the step S504 is Yes, meaning that the exposure has ended, i.e., the shutter has closed (time t6) then the controller 42 determines whether or not the drive voltage for the output amplifier 20 has been lowered (step S508) If the answer of the step S508 is Yes, then the controller 42 causes the driver 22 to raise the drive voltage to the first voltage of 16 V (time t7) (step S510). The driver 22 therefore again drives the output amplifier 20 with 16 V.

Subsequently, at a time t8, the controller 42 causes the image sensor 12 to start rapidly sweeping unnecessary charges from the vertical registers 16 and horizontal register 18 via the driver 22 (step S512). At a time t9, the controller 42 causes signal charges generated in the photodiode 14 to start being shifted to the associated vertical resistors 16 by field shift and read out (step S514). At this instant, the image sensor 12 operates in the same manner as described specifically in relation to the step S316 of FIG. 3.

As stated above, in the embodiments shown and described, the drive voltage for driving the output amplifier 20 is lowered after the start of exposure. Before signal charges generated in the photodiodes 14 are read out, the drive voltage is raised to the usual voltage. More specifically, in the event of long exposure, the output amplifier 20 is driven by the lower drive voltage. Therefore, even when the output amplifier 20 is driven over a long period of time, it generates a minimum of heat and protects the resulting image from fog. It follows that even when the exposure time is as long as several sends to several ten seconds, it is possible to reduce locally generated unnecessary charges, which are not derived from incident light, and therefore to insure an attractive image free from an irregular luminance distribution.

Further, the various sections of the camera 10, particularly the output amplifier 20, is not fully deactivated during exposure, but is continuously driven by the second or lower drive voltage. This is successful to continuously discharge unnecessary charges ascribable to, e.g., thermal noise via the output amplifier 20 during long exposure. The camera 10 therefore noticeably reduces local irregularity in dark current ascribable to the long drive of the output amplifier 20.

Assume that the shutter is held open over a long period of time to continuously store signal charges, and that the optical path between the lens and the scene being picked up is repeatedly opened and closed by hand for producing a superposed image. Then, the camera 10 can output an image free from irregularity in dark current even in the above condition in the same manner as during bulb exposure. This is also true when the mechanical shutter is repeatedly opened and closed a plurality of times.

Whether a voltage VRD applied to the reset drain RD and the source voltage VDD are the same as or different from each other, the illustrative embodiments shown and described are practicable. For example, assume that in the image sensor 12 shown in FIG. 2, a lead terminal 210 for applying the voltage VRD to a reset drain RD and a lead terminal 212 for applying the voltage VDD to the source-follower circuit are connected together by, e.g., wire bonding. Then, while the voltage VRD of, e.g., 16 V is applied to the reset drain RD, the voltage VDD for the source-follower circuit is lowered to 0 V. As a result, the FD layer is set at the reset potential VDD. By maintaining this condition, it is possible to prevent the output amplifier 20 from generating heat. In such a case, the voltage switching circuit 40 of the driver 22 will selectively apply the output 100 of the power source circuit 100 to the output amplifier 20 either directly or after reducing it to 0 V (VDD) in response to the control signal 44.

Therefore, to drive the image sensor having the above-described specific configuration, the voltage switching circuit 40 should preferably be constructed to selectively shut off the source voltage VDD that drives the output amplifier 20. With this capability, the circuit 40 can selectively control the lead connected to the output amplifier 20 for voltage application to 16 V or 0 V in accordance with the control signal 44

As for the voltage for the reset drain RD, the voltage VRD of about 16 V similar to the higher drive voltage may be applied to the image sensor 12 via an extra terminal without regard to the status of the control signal 44. This allows only the source current of the output amplifier 20 and therefore the operation of the source-follower circuit to be interrupted, while maintaining the photodiodes 14 and registers 16 and 18 active. This alternative configuration also reduces heat to be generated by the output amplifier 20 during long exposure.

Figure 7:
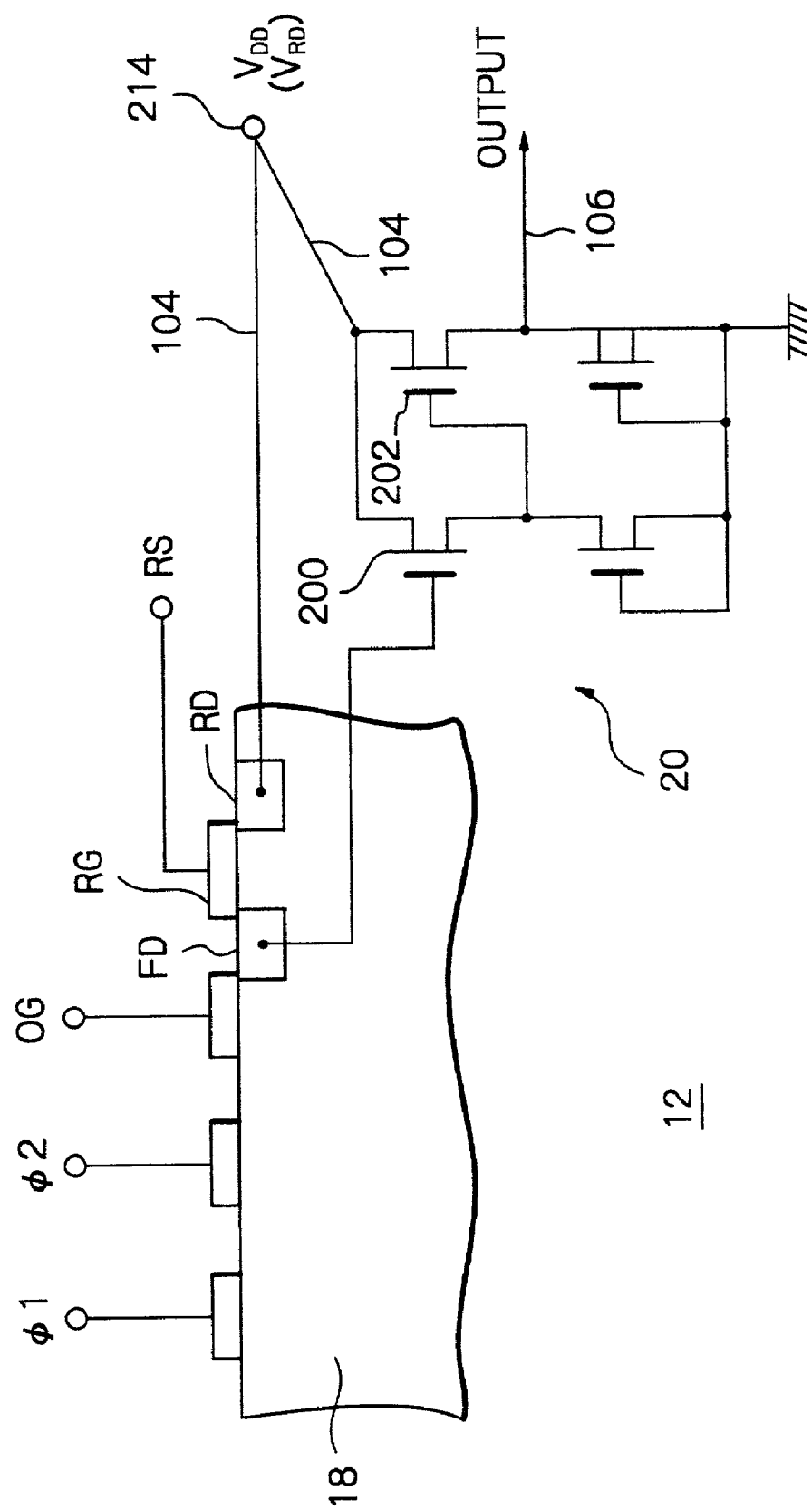
FIG. 7 shows another specific configuration of the output section of the image sensor.

FIG. 7 shows another specific configuration of the output portion of the image sensor 12. As shown, a lead terminal 214 is connected to both of the reset drain RD and source-follower circuit by wire bonding or similar technology. The voltages VRD and VDD both are applied via the lead terminal 214 to the reset drain RD and source-follower circuit, respectively. In this configuration, the voltage of about 16 V and the voltage of about 3 V are selectively applied to the lead terminal 214. Specifically, in response to the control signal 44, the voltage of about 3 V is applied to the lead terminal 214 so as to drive the output amplifier 20 without interrupting the operation of the photodiodes 14 or that of the registers 16 and 18.

As stated above, in the illustrative embodiment, the voltage VDD applied to the source-follower circuit for driving the output amplifier 20 is lowered from the usual or high voltage to the low voltage, which includes 0 V, in response to the control signal 44. The output amplifier 20 therefore generates a minimum of heat or no heat when exposure continues over more than a preselected period of time.

While the reference period of time for determining whether or not to switch the drive voltage is selected to be 1 second in the illustrative embodiments, it is only illustrative. The reference period of time, of course, depends on the structure, size and drive frequency of the image sensor 12 and the source voltage for driving the image sensor 12 as well as on required image quality. For example, the reference period of time may be as short as 0.5 second to 1.0 second or as long as 1 second to 3 second.

The camera 10 may additionally include a circuit for sensing ambient temperature around the camera 10 that effects the amount of dark current, in which case the control timing will be varied in accordance with ambient temperature. Specifically, the reference period of time will be increased if ambient temperature is lower than a reference temperature or reduced if otherwise. Moreover, assume that the camera 10 is operated in an environment whose temperature is as high as an upper limit assigned to the camera 10 beforehand, causing unnecessary charges to noticeably appear due to dark current. Then, the reference period of time may even be zero second in order to suppress or practically interrupt the drive of the output amplifier 20 throughout exposure.

In summary, it will be seen that the present invention provides an image pickup control device and an image pickup control method capable of reducing, even when exposure continues over a reference period of time, local temperature elevation ascribable to the heat generation of an outputting portion, which detects signal charges. That is, the camera maintains all photosensitive devices thereof at the same temperature. This successfully protects an image signal from local irregularity in luminance, fog and other defects and thereby insures an attractive image even at the time of long exposure. For example, the camera allows its shutter to be opened over a longer period of time for a night shot or a shot with a small lens opening and insures desirable image quality even at the time of long bulb exposure. The camera can therefore shoot a desired scene over a broad range of conditions, i.e., from a high shutter speed to a low shutter speed.

The entire disclosure of Japanese patent application Nos. 2000-107995 and 2001-69051 respectively filed on Apr. 5, 2000 and Mar. 12, 2001 including the specifications, claims, accompanying drawings and abstracts of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An image pick up control device for driving an image sensor comprising:
   a photosensitive section in which a plurality of photosensitive devices are arranged for generating signal charges corresponding to incident light;
   a plurality of vertical transfer paths for vertically transferring said signal charges;
   a horizontal transfer path for horizontally transferring said signal charges transferred from said plurality of vertical transfer paths;
   an outputting circuit for detecting said signal charges transferred from said horizontal transfer path and outputting electric signals corresponding to said signal charges;
   a driver for driving said image sensor;
   a controller for feeding a first control signal to said driver to thereby control an exposure time over which said image sensor generates the signal charges; and
   a switching circuit for switching a power supply voltage for driving said outputting circuit in accordance with a second control signal and then feeding said power supply voltage to said outputting circuit;

said driver comprising a signal generating circuit for generating timing signals for causing said image sensor to transfer the signal charges, which are generated over the exposure time, to said outputting circuit via said plurality of vertical transfer paths and said horizontal transfer path;

said controller feeding said second control signal to said switching circuit for controlling said switching circuit in accordance with the exposure time;

said controller determining the exposure time in accordance with an exposure value for shooting a desired scene and feeding said second control signal to said switching circuit at a timing matching with said exposure time to thereby cause said switching circuit to drive said outputting circuit at a low voltage.

2. The device in accordance with claim 1, wherein said switching circuit switches the power supply voltage from a first voltage for using the electric signals output from said image sensor as an image signal to a second voltage lower than said first voltage and applies said second voltage to said outputting circuit.

3. The device in accordance with claim 2, wherein said switching circuit switches, immediately before the exposure time expires, the power supply voltage from the second voltage to the first voltage and applies said first voltage to said outputting circuit.

4. The device in accordance with claim 2, wherein said switching circuit switches, when the exposure time expires, the power supply voltage from the second voltage to the first voltage and applies said second voltage to said outputting circuit.

5. The device in accordance with claim 2, wherein said controller comprises a circuit for controlling a bulb exposure for starting and ending the exposure time in accordance with an operator's command, and controls said driver on detecting the end of said exposure time, and said driver switches the power supply voltage from the second voltage to the first voltage under the control of said controller and applies said first voltage to said outputting circuit.

6. The device in accordance with claim 1, wherein said driver causes said image sensor to discharge unnecessary charges when applied with the second voltage.

7. The device in accordance with claim 1, wherein said controller feeds said second control signal to said switching circuit when the exposure time is longer than a reference period of time.

8. The device in accordance with claim 7, wherein said reference period of time is substantially 1 second since a start of exposure.

9. The device in accordance with claim 1, wherein said controller comprises a determining circuit for determining an exposure value on the basis of the electric signals output from said image sensor and controls the exposure time in accordance with said exposure value.

10. The device in accordance with claim 1, wherein when a reference period of time expires since a start of exposure, said controller feeds said second control signal to said switching circuit.

11. The device in accordance with claim 1, wherein after feeding said second control signal to said switching circuit, said controller restores an original drive voltage, which drives said outputting circuit, when the exposure time expires.

12. The device in accordance with claim 1, further comprising:

a release switch for outputting a release signal representative of an operator's operation; and a signal processor for processing the electric signals output from said image sensor;

wherein said controller controls said driver in accordance with the release signal.

13. A method of controlling an image sensor comprising a photosensitive section for generating signal charges corresponding to light incident to a photosensitive surface, transfer paths for transferring said signal charges, and an outputting circuit for detecting said signal charges transferred from said transfer paths and outputting electric signals corresponding to said signal charges for thereby generating an image signal representative of a scene being picked up, said method comprising the steps of:

determining an exposure time in accordance with an exposure value for shooting a desired scene;

determining whether or not the exposure time of said photosensitive section is a preselected long exposure time;

driving, if the exposure time is the preselected long exposure time, said image sensor with a low voltage lower than a usual drive voltage; and driving, when the signal charges generated in said photosensitive section are to be read out, said image sensor with said usual voltage instead of said lower voltage.

14. The method in accordance with claim 13, wherein if the exposure time is the preselected long exposure time, said outputting circuit is driven by said low voltage.

15. The method in accordance with claim 13, wherein if the exposure time is the preselected long exposure time, said low voltage is replaced with said usual voltage immediately before said exposure time expires.

16. The method in accordance with claim 13, wherein if the exposure time is the preselected long exposure time, said low voltage is replaced with said usual voltage when said exposure time expires.

17. The method in accordance with claim 13, wherein the exposure time is determined by automatic exposure control.

18. The method in accordance with claim 13, wherein the exposure time is determined by a manual operation.

19. The method in accordance with claim 18, wherein said low voltage is replaced with said usual voltage after an expiration of the exposure time has been detected.

* * * * *